United States Patent
Pradhan et al.

(10) Patent No.: US 12,261,776 B2
(45) Date of Patent: Mar. 25, 2025

(54) DYNAMIC L2VPN PSEUDOWIRE SIGNALING THROUGH SEGMENT ROUTING

(71) Applicant: Ciena Corporation, Hanover, MD (US)

(72) Inventors: Susanta Kumar Pradhan, Gurgaon (IN); Mukul Sharma, Gurgaon (IN); Amit Kumar Choudhary, Dwarka (IN); Mohit Sharma, Jaipur (IN)

(73) Assignee: Ciena Corporation, Hanover, MD (US)

( * ) Notice: Subject to any disclaimer, the term of this patent is extended or adjusted under 35 U.S.C. 154(b) by 213 days.

(21) Appl. No.: 17/571,256

(22) Filed: Jan. 7, 2022

(65) Prior Publication Data

US 2023/0164068 A1    May 25, 2023

(30) Foreign Application Priority Data

Nov. 23, 2021    (IN) .............................. 202111053876

(51) Int. Cl.
*H04L 45/12*    (2022.01)
*H04L 45/42*    (2022.01)
*H04L 45/586*    (2022.01)
*H04L 45/745*    (2022.01)

(52) U.S. Cl.
CPC .......... *H04L 45/586* (2013.01); *H04L 45/123* (2013.01); *H04L 45/42* (2013.01); *H04L 45/745* (2013.01)

(58) Field of Classification Search
CPC ..... H04L 45/586; H04L 45/123; H04L 45/42; H04L 45/745; H04L 45/04; H04L 45/50; H04L 45/68
See application file for complete search history.

(56) References Cited

U.S. PATENT DOCUMENTS

| | | |
|---|---|---|
| 8,295,278 B2 | 10/2012 | Shah et al. |
| 8,897,140 B1 | 11/2014 | Bhattacharya |
| 9,210,075 B2 | 12/2015 | Bhattacharya |
| 9,350,605 B2 | 5/2016 | Bhattacharya et al. |
| 9,407,535 B2 | 8/2016 | Hu et al. |
| 10,237,634 B2 | 3/2019 | West et al. |
| 10,686,699 B2 | 6/2020 | Duncan et al. |
| 2017/0033939 A1 | 2/2017 | Bragg et al. |
| 2018/0295054 A1* | 10/2018 | Chunduri ............... H04L 45/50 |
| 2019/0109785 A1* | 4/2019 | Chunduri ............... H04L 45/54 |
| 2019/0245787 A1* | 8/2019 | Skalecki ............... H04L 47/35 |
| 2020/0304365 A1 | 9/2020 | Bhardwaj et al. |
| 2020/0358681 A1 | 11/2020 | Shah et al. |
| 2021/0258243 A1 | 8/2021 | Narasimhan et al. |

* cited by examiner

*Primary Examiner* — Abdulkader M Alriyashi
(74) *Attorney, Agent, or Firm* — Baratta Law PLLC; Lawrence A. Baratta, Jr.

(57) ABSTRACT

Systems and methods include receiving a pseudowire configuration for a pseudowire with a second network element; configuring the pseudowire as segment routing; adding the pseudowire configuration in link state advertisements (LSAs) that are flooding in a network via an interior gateway protocol (IGP); and maintaining a state of the pseudowire based on the flooding. The state is maintained without using label distribution protocol (LDP) or border gateway protocol-auto discovery (BGP-AD).

17 Claims, 2 Drawing Sheets

DYNAMIC L2VPN PSEUDOWIRE SIGNALING THROUGH SEGMENT ROUTING

FIELD OF THE DISCLOSURE

The present disclosure generally relates to networking. More particularly, the present disclosure relates to systems and methods for dynamic layer 2 (L2) virtual private network (VPN) signaling through segment routing instead of targeted label distribution protocol (TLDP) and border gateway protocol (BGP) auto discovery (AD) (BGP-AD).

BACKGROUND OF THE DISCLOSURE

L2VPNs employ L2 services over multiprotocol label switching (MPLS) in order to build a topology of point-to-point connections that connect end customer sites in a VPN. These L2VPNs provide an alternative to private networks that have been provisioned by means of dedicated leased lines or by means of L2 virtual circuits that employ ATM or Frame Relay. The service provisioned with these L2VPNs is known as Virtual Private Wire Service (VPWS) or Virtual Private LAN Service (VPLS). L2VPNs are built with Pseudowire (PW) technology. PWs provide a common intermediate format to transport multiple types of network services over a Packet Switched Network (PSN)—a network that forwards packets—IPv4, IPv6, MPLS, Ethernet. PW technology provides Like-to-Like transport and also Interworking (1 W). Frames that are received at the PE router on the attachment circuit (AC) are encapsulated and sent across the PSW to the remote PE router. The egress PE router receives the packet from the PSW and removes their encapsulation. The egress PE extracts and forwards the frame to the AC.

Conventionally, networks require PW signaling using TLDP/BGP-AD. Even if a customer network is pure segment routing based, to bring up the pseudowires, we need TLDP/BGP-AD sessions between peers for pseudowire signaling. These are extra protocols requiring significant processing resources.

BRIEF SUMMARY OF THE DISCLOSURE

The present disclosure relates to systems and methods for dynamic layer 2 (L2) virtual private network (VPN) signaling through segment routing instead of targeted label distribution protocol (TLDP) and border gateway protocol (BGP) auto discovery (AD) (BGP-AD). With this implementation, we will not need to plan and use additional protocols like LDP & BGP-AD and the work will be done with the existing segment routing network.

In various embodiments, the present disclosure includes a method having steps, a network element including at least one processor and memory with instructions that, when executed, cause the at least one processor to implement the steps, and a non-transitory computer-readable medium having instructions stored thereon for programming a network element to perform the steps.

The steps include receiving a pseudowire configuration for a pseudowire with a second network element; configuring the pseudowire as segment routing; adding the pseudowire configuration in link state advertisements (LSAs) that are flooded in a network via an interior gateway protocol (IGP); and maintaining a state of the pseudowire based on the flooded LSAs. The state is maintained without using label distribution protocol (LDP) or border gateway protocol-auto discovery (BGP-AD).

The pseudowire configuration can include a pseudowire label and any pseudowire signaling parameters. The pseudowire signaling parameters can include any of flow-aware transport (FAT), control word (CW), maximum transmission unit (MTU), virtual circuit (VC) identifier, and peer internet protocol (IP) address. The pseudowire configuration can include a pseudowire label that is flooded in a segment routing capability type-length-value (TLV) or in a sub type-length-value (TLV) under an extended IS reachability TLV.

The pseudowire configuration can include one or more pseudowire signaling parameters that are flooded in a sub type-length-value (TLV) under an extended IS reachability TLV. The IGP can be intermediate system-intermediate system (ISIS) or open shortest path first (OSPF). Other network elements including the second network element maintain the state of the pseudowire based on the flooding.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for dynamic layer 2 (L2) virtual private network (VPN) signaling through segment routing instead of targeted label distribution protocol (TLDP) and border gateway protocol (BGP) auto discovery (AD) (BGP-AD). With this implementation, we will not need to plan and use additional protocols like LDP and BGP-AD and the work will be done with the existing segment routing network.

The present disclosure includes dynamic L2VPN pseudowire signaling through segment routing. In a network element, a new signaling type is added in the L2VPN configuration where the user can bypass SR/LDP/BGP-AD as signaling protocol. Also, there is a new sub type-length-value (TLV) to send PW ID/peer-address and signaling parameters information (flow-aware transport (FAT), control word (CW), maximum transmission unit (MTU), etc) in extended intermediate system (IS) reachability TLV of intermediate system-intermediate system (ISIS) link state protocol (LSP).

A large number of pseudowires can be carried through a single segment routing tunnel in the network. Thus, it is never necessary to maintain state in the network core for individual Pseudowires. Earlier the PW label bindings used to be distributed using the LDP downstream Unsolicited and BGP-AD. This disclosure enables pseudowire signalling over Segment Routing without using TLDP and BGP-AD in segment routing networks. With this implementation, we will not need to plan and use additional protocols like LDP and BGP-AD and the work will be done with the existing segment routing network.

Figure 1:
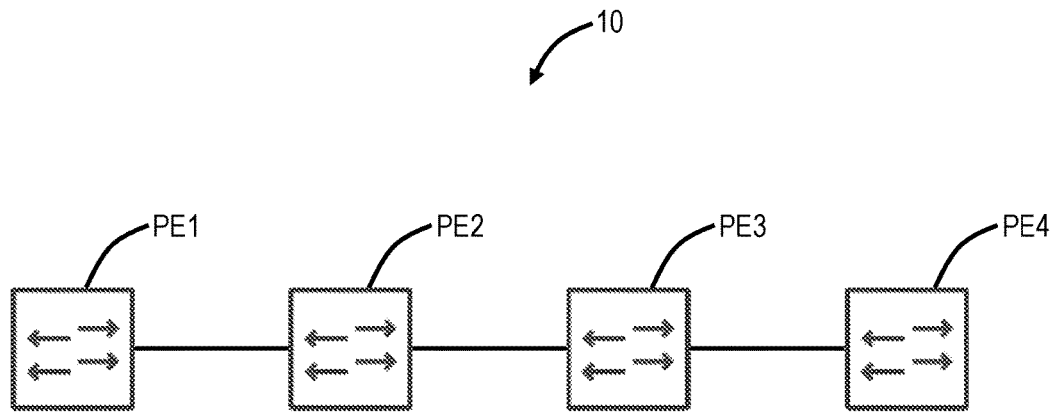
FIG. 1 is a network diagram of a network illustrating segment routing-based pseudowire signaling.
Figure 3:
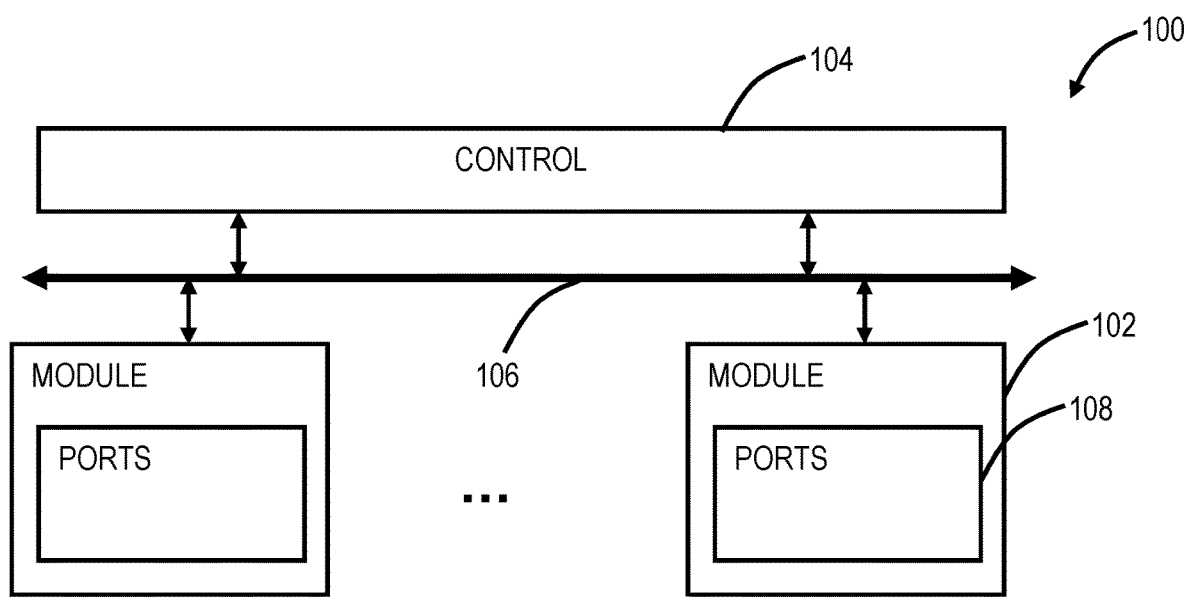
FIG. 3 is a block diagram of an example implementation of a network element, such as for any of the network elements in the network of FIG. 1.

FIG. 1 is a network diagram of a network 10 illustrating segment routing-based pseudowire signaling. The network 10 includes four example network elements PE1-PE4 (i.e., provider edge (PE). The network 10 is presented for illustration purposes and those skilled in the art will recognize other network configurations are also contemplated. The network elements PE1-PE4 are PE routers and other network components are omitted for simplicity. An example of the network elements PE1-PE4 is illustrated in FIG. 3. Each of the network elements PE1-PE4 can be configured with interior gateway protocol (IGP) such as ISIS and/or open shortest path first (OSPF) for reliably flooding link state information between one another. In this example, we intend to configure a pseudowire between the network elements PE1, PE4.

Conventionally, LDP and BGP-AD are used to continually maintain pseudowire states for each session. The present disclosure leverages segment routing and ISIS/OSPF to remove the need to maintain pseudowire sessions. Although, we have come up with one more way where acknowledgment may not be required at all. It is based on the criteria that the database in an area should be identical at each network element PE1-PE4 in an area. The database in each network element PE1-PE4 is populated based on the flooding in IGP.

Figure 2:
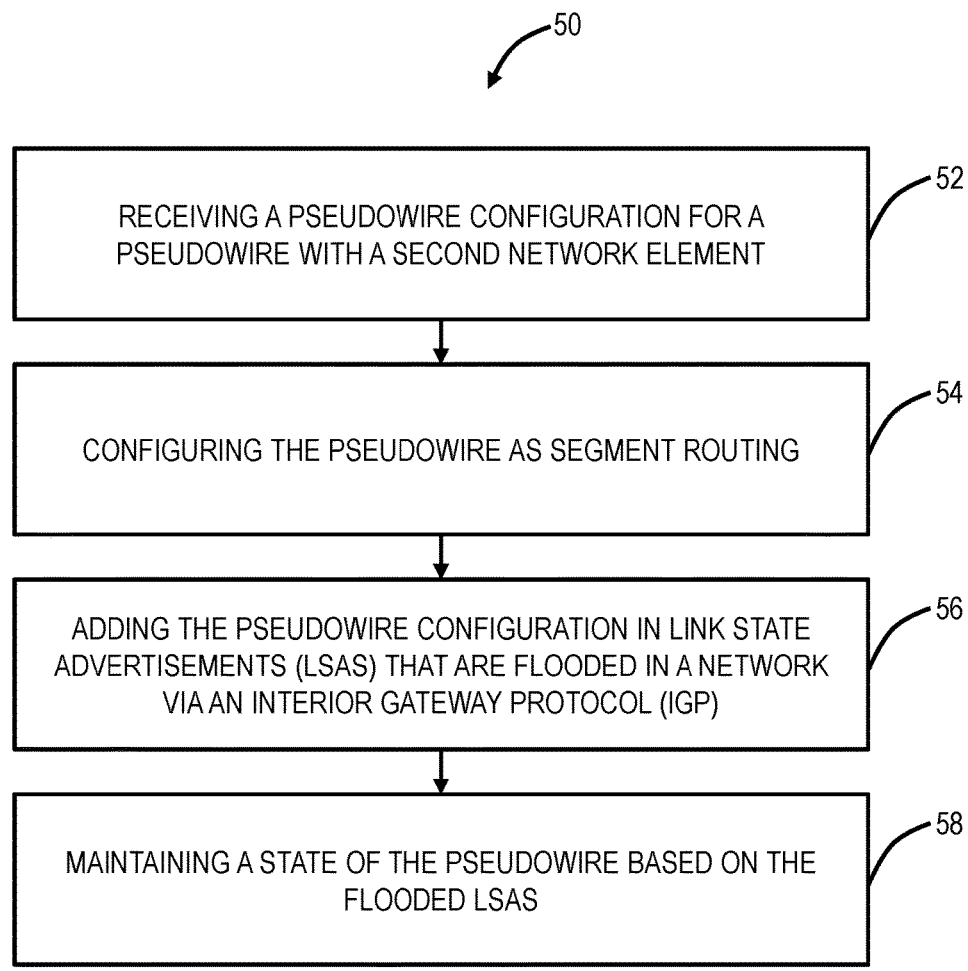
FIG. 2 is a flowchart of a process of dynamic layer 2 (L2) virtual private network (VPN) signaling through segment routing.

FIG. 2 is a flowchart of a process 50 of dynamic layer 2 (L2) virtual private network (VPN) signaling through segment routing. The process 50 can be realized as a method having steps, via the network element PE1 including at least one processor and memory with instructions that, when executed, cause the at least one processor to implement the steps, and a non-transitory computer-readable medium having instructions stored thereon for programming at least one processor to perform the steps.

The steps include receiving a pseudowire configuration for a pseudowire with a second network element (step 52); configuring the pseudowire as segment routing (step 54); adding the pseudowire configuration in link state advertisements (LSAs) that are flooded in a network via an interior gateway protocol (IGP) (step 56); and maintaining a state of the pseudowire based on the flooded LSAs (step 58). The state is maintained without using label distribution protocol (LDP) or border gateway protocol-auto discovery (BGP-AD).

The pseudowire configuration can include a pseudowire label and any pseudowire signaling parameters. The pseudowire signaling parameters include any of flow-aware transport (FAT), control word (CW), maximum transmission unit (MTU), virtual circuit (VC) identifier, and peer internet protocol (IP) address.

The pseudowire configuration can include a pseudowire label that is flooded in a sub type-length-value (TLV) under an extended IS reachability TLV. The pseudowire configuration can include one or more pseudowire signaling parameters that are flooded in a sub type-length-value (TLV) under an extended IS reachability TLV.

The IGP can be intermediate system-intermediate system (ISIS) or open shortest path first (OSPF). Other network elements including the second network element can maintain the state of the pseudowire based on the flooding.

The process 50 is implemented during pseudowire configuration where a new sub TLV can be added to communicate the pseudowire label and other pseudowire signaling parameters information within an ISIS sub TLV.

The operating principle is: i) as soon as we configure pseudowire on a device over segment routing transport, the signaling type is configured as segment routing in L2VPN configuration, ii) the pseudowire label can go in a segment routing—capability TLV, iii) other pseudowire signaling (FAT capability, CW, MTU, STLV, MW etc) parameters can go via a new sub-TLV under Extended IS reachability TLV under ISIS LSP messaging, iv) also, VC-ID and peer IP address can go in the sub-TLV under Extended IS reachability TLV under ISIS LSP messaging.

A non-limiting example sub-TLV in the extended IS reachability TLV can be:

| Sub-TLV Type | Length (Octets) | Name |
|---|---|---|
| 23 | 4 | ISIS-L2VPN |

Also, the same can be implemented using OSPF as IGP also.

Referring back to FIG. 1, various scenarios are described as follows:

Scenario #1:

All links are up on each network element, ISIS has converged on each network element, and all have reachability information about each other network element. A pseudowire configuration is provided to the network element PE1, the network element PE1 sends an LSP message to PE2 with the proposed sub-TLV, and the network element PE1 installs the label in its pseudowire code.

On receiving the LSP, the network element PE2 refreshes its ISIS database and does not take any action based on the sub-TLV and floods the LSP to the network element PE3.

On receiving the LSP, the network element PE3 refreshes its ISIS database and does not take any action based on the sub-TLV and floods the LSP to the network element PE4.

On receiving the LSP, the network element PE4 refreshes its ISIS database and saves the label in the sub-TLV in its pseudowire code. When the network element PE4 is provisioned with pseudowire config, it installs the label received from the network element PE1 as pseudowire out-label and sends its own LSP with the proposed sub-TLV consisting of its in-label and also install that label as in-label.

The network element PE1 receives the flooded LSP from the network element PE4 and installs both out-label and in-label and hence the end-to-end (e2e) pseudowire is installed.

Scenario #2:

Assume the link between the network elements PE2, PE3 is down. The pseudowire configuration is given on the network element PE1. The network element PE1 sends an LSP message to the network element PE2 with the proposed sub-TLV. The network element PE1 installs the label in its pseudowire code.

On receiving the LSP, the network element PE2 refreshes its ISIS database and does not take any action based on the sub-TLV.

The LSP is not flooded to the network element PE3 since the ISIS neighborship is down between the network elements PE2, PE3.

Once the link between the network elements PE2, PE3 comes up, ISIS neighborship comes up and subsequently the network element PE4 receives the LSP and the e2e pseudowire is established as in scenario #1.

Scenario #3:

All links are up and the e2e pseudowire is established and traffic is also flowing normally.

The link between the network elements PE2, PE3 goes down. Now we can decide to keep the pseudowire label for the hold time of the LSP. Once the hold time expires, the subsequent LSPs are flushed from all the ISIS databases and along with that pseudowire label is also released.

Example Implementations

The TLV information can cover both forwarding equivalence class (FEC) 128 and 129 pseudowires.

An example sub-TLV structure for FEC 128 would be as follows. The FEC 128 would be used whenever both pseudowire endpoints have been provisioned with the same 32-bit identifier.

Type: L2VPN, suggested value 23.
Length: variable.
Flags: 1 octet field of following flags:

| 0 | 1 | 2 | 3 | 4 | 5 | 6 | 7 |
|---|---|---|---|---|---|---|---|
| S | M | D | C | F | 0 | 0 | 0 | where:

S-Flag: Status flag. If unset, then the Status propagation is not done. If set, then the status is set as per the value in pseudowire Status field.

M-Flag: media access control (MAC) withdrawal flag. If set, then the MAC addresses values are sent as per the value in MAC Addresses field.

D-Flag: Delete flag. If set, the originator and recipient nodes will release the in and out pseudowire labels.

C-Flag: Control Word flag. If set, it indicates that Control word is present on this pseudowire. If unset, it indicates that Control word is not present on this pseudowire.

F-Flag: FAT flag. If set, it indicates that Flow Aware Transport capability is supported.

Other bits can be zero when originated and ignored when received.

PWid: 0x80

PW type: A 16-bit value representing the type of pseudowire.

Group ID: A 32-bit value to represent the pseudowires which are in same group.

PW ID: A non-zero 32-bit value representing a particular pseudowire. The PW ID and the PW type MUST be same at both pseudowire endpoints.

Peer IP Address: A 32-bit value to represent the IP address of the PW destination end point.

MTU: A 16-bit value representing the interface MTU value.

Flow Label: A 16-bit value to specify whether PE is able to send/receive flow label. First 2 bits are used for Tx/RX. Rest 14 bits are reserved bits. These bits MUST be set as zero on transmit and MUST be ignored on receive.

VCCV: A 16-bit value to represent CC and CV type values.

PW Status: 32-bit field that is used to carry Attachment Circuit, PWE and underlying tunnel Status.

MAC Addresses: 32-bit field that is used to carry the mac addresses for which the MW will happen.

Example Network Element

FIG. 3 is a block diagram of an example implementation of a network element 100, such as for any of the network elements PE1-PE4 in the network 10. Those of ordinary skill in the art will recognize FIG. 3 is a functional diagram in an oversimplified manner, and a practical embodiment may include additional components and suitably configured processing logic to support known or conventional operating features that are not described in detail herein.

In an embodiment, the network element 100 is a packet switch, but those of ordinary skill in the art will recognize the systems and methods described herein can operate with other types of network elements and other implementations that support SR networking. In this embodiment, the network element 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the network element 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the network element 100 out by the correct port 108 to the next network element 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the network element 100. The network interface may be utilized to communicate with an element manager, a network management system, the PCE 20, etc. Additionally, the control module 104 can include a database that tracks and maintains provisioning, configuration, operational data, and the like.

Again, those of ordinary skill in the art will recognize the network element 100 can include other components which are omitted for illustration purposes, and that the systems and methods described herein are contemplated for use with a plurality of different network elements with the network element 100 presented as an example type of network element. For example, in another embodiment, the network element 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 3 is meant to provide a functional view, and those of ordinary skill in the art will recognize actual hardware implementations may vary.

Example Controller

Figure 4:
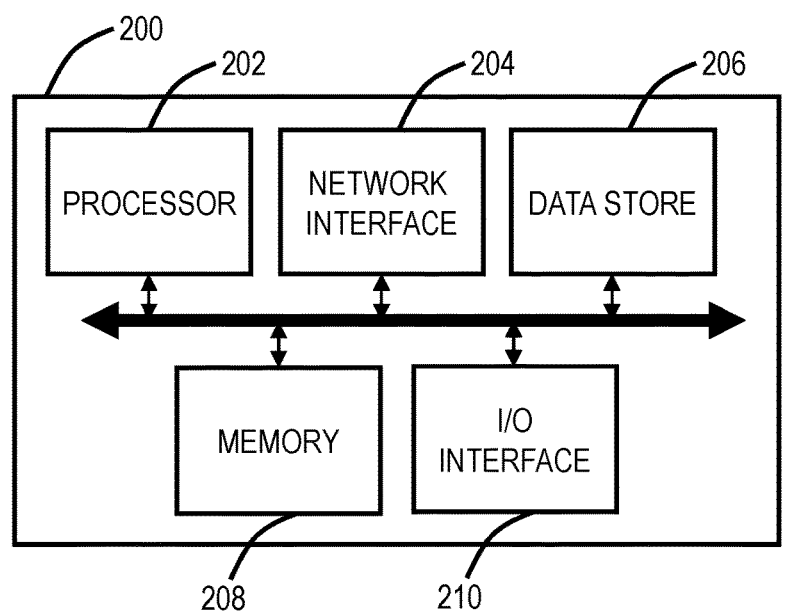
FIG. 4 is a block diagram of an example processing device, which can form a control module for a network element.

FIG. 4 is a block diagram of an example processing device 200, which can form a control module for a network element. The processing device 200 can be part of the network element, or a stand-alone device communicatively coupled to the network element. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, to the nodes 12, the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A network element comprising:
    a plurality of ports and switching circuitry configured to switch data there between; and
    a controller configured to
        receive a pseudowire configuration for a pseudowire with a second network element,
        configure the pseudowire as segment routing,
        add the pseudowire configuration in link state advertisements (LSAs) that are flooded in a network via an interior gateway protocol (IGP), and
        maintain a state of the pseudowire based on the flooded LSAs and the pseudowire configuration included therein, wherein the pseudowire configuration includes pseudowire signaling parameters that are flooded in a sub type-length-value (TLV) under an extended IS reachability TLV, wherein the pseudowire signaling parameters include a plurality of flow-aware transport (FAT), control word (CW), maximum transmission unit (MTU), virtual circuit (VC) identifier, and peer internet protocol (IP) address.

2. The network element of claim 1, wherein the state is maintained without using label distribution protocol (LDP) or border gateway protocol-auto discovery (BGP-AD).

3. The network element of claim 1, wherein the pseudowire configuration includes a pseudowire label and the pseudowire signaling parameters.

4. The network element of claim 1, wherein the pseudowire configuration further includes a pseudowire label assigned for layer 2 emulation that is flooded in the sub type-length-value (TLV) under the extended IS reachability TLV.

5. The network element of claim 1, wherein the IGP is intermediate system-intermediate system (ISIS).

6. The network element of claim 1, wherein the IGP is open shortest path first (OSPF).

7. The network element of claim 1, wherein other network elements including the second network element maintain the state of the pseudowire based on the flooding and the pseudowire configuration included therein.

8. A method implemented by a first network element comprising steps of:
   receiving a pseudowire configuration for a pseudowire with a second network element;
   configuring the pseudowire as segment routing;
   adding the pseudowire configuration in link state advertisements (LSAs) that are flooded in a network via an interior gateway protocol (IGP); and
   maintaining a state of the pseudowire based on the flooded LSAs and the pseudowire configuration included therein, wherein the pseudowire configuration includes pseudowire signaling parameters that are flooded in a sub type-length-value (TLV) under an extended IS reachability TLV, wherein the pseudowire signaling parameters include a plurality of flow-aware transport (FAT), control word (CW), maximum transmission unit (MTU), virtual circuit (VC) identifier, and peer internet protocol (IP) address.

9. The method of claim 8, wherein the state is maintained without using label distribution protocol (LDP) or border gateway protocol-auto discovery (BGP-AD).

10. The method of claim 8, wherein the pseudowire configuration includes a pseudowire label and the pseudowire signaling parameters.

11. The method of claim 8, wherein the pseudowire configuration further includes a pseudowire label that is flooded in the sub type-length-value (TLV) under the extended IS reachability TLV.

12. The method of claim 8, wherein the IGP is intermediate system-intermediate system (ISIS).

13. The method of claim 8, wherein the IGP is open shortest path first (OSPF).

14. The method of claim 8, wherein other network elements including the second network element maintain the state of the pseudowire based on the flooding and the pseudowire configuration included therein.

15. A non-transitory computer-readable medium having instructions stored thereon for programming a network element to perform steps of:
   receiving a pseudowire configuration for a pseudowire with a second network element;
   configuring the pseudowire as segment routing;
   adding the pseudowire configuration in link state advertisements (LSAs) that are flooding in a network via an interior gateway protocol (IGP); and
   maintaining a state of the pseudowire based on the flooding and the pseudowire configuration included therein, wherein the pseudowire configuration includes pseudowire signaling parameters that are flooded in a sub type-length-value (TLV) under an extended IS reachability TLV, wherein the pseudowire signaling parameters include a plurality of flow-aware transport (FAT), control word (CW), maximum transmission unit (MTU), virtual circuit (VC) identifier, and peer internet protocol (IP) address.

16. The non-transitory computer-readable medium of claim 15, wherein the state is maintained without using label distribution protocol (LDP) or border gateway protocol-auto discovery (BGP-AD).

17. The non-transitory computer-readable medium of claim 15, wherein other network elements including the second network element maintain the state of the pseudowire based on the flooding and the pseudowire configuration included therein.

\* \* \* \* \*